(12) United States Patent
Jahn (10) Patent No.: US 10,820,973 B2
(45) Date of Patent: Nov. 3, 2020

(54) POSITION CAPTURING DEVICE FOR TOOTH IMPLANTS

(71) Applicant: nt-trading GmbH & Co. KG, Karlsruhe (DE)

(72) Inventor: Dirk Jahn, Weyher (DE)

(73) Assignee: nt-trading GmbH & Co. KG, Karlsruhe (DE)

( * ) Notice: Subject to any disclaimer, the term of this patent is extended or adjusted under 35 U.S.C. 154(b) by 173 days.

(21) Appl. No.: 15/862,767

(22) Filed: Jan. 5, 2018

(65) Prior Publication Data

US 2018/0125619 A1 May 10, 2018

Related U.S. Application Data

(63) Continuation of application No. PCT/EP2016/066723, filed on Jul. 14, 2016.

(30) Foreign Application Priority Data

Jul. 15, 2015 (DE) .................... 10 2015 111 482

(51) Int. Cl.
 *A61C 13/34* (2006.01)
 *A61C 8/00* (2006.01)
 (Continued)

(52) U.S. Cl.
 CPC ............ *A61C 13/34* (2013.01); *A61C 8/0001* (2013.01); *A61C 19/04* (2013.01); *G09B 23/283* (2013.01)

(58) Field of Classification Search
 CPC ........... A61C 13/34; A61C 8/01; A61C 19/04; A61C 8/00; A61C 8/001; A61C 8/0001; A61C 8/0048; A61C 19/005
 (Continued)

(56) References Cited

U.S. PATENT DOCUMENTS 4,854,872 A * 8/1989 Detsch ................. A61C 8/0001
                                                               433/173
5,055,047 A   10/1991 Names
 (Continued)

FOREIGN PATENT DOCUMENTS

DE    4115335 A1 * 11/1992  ............. A61C 1/084
DE    4115335 A1   11/1992
 (Continued)

OTHER PUBLICATIONS

International Search Report for PCT/EP2016/066723; dated Oct. 5, 2016; 3 pp.
 (Continued)

*Primary Examiner* — Edward Moran
*Assistant Examiner* — Matthew P Saunders
(74) *Attorney, Agent, or Firm* — Harness, Dickey & Pierce, P.L.C.

(57) ABSTRACT

A position capturing device for tooth implants in a patient's mouth includes multiple position capturing units, each with an elongated transfer post with a shank. The device includes a tooth implant interface and a bore configured to receive a tooth implant screw. The device includes a carrier unit, configured to interconnect the position capturing units, that includes a carrier element and first and second fixing elements. The first fixing element includes a fastening element configured to pivotably and lockably attach to the carrier element, a shank-receiving element with a sleeve-shaped portion configured to be plugged onto the shank, and a clamping screw connecting the fastening element and the shank-receiving element to be rotatable relative to each other. The fastening element includes a sleeve-shaped portion configured to surround the carrier element and allow a displacement of the fastening element along the carrier element.

12 Claims, 5 Drawing Sheets

(51) Int. Cl.
  *A61C 19/04* (2006.01)
  *G09B 23/28* (2006.01)
(58) Field of Classification Search
  USPC .................................................. 433/172–176
  See application file for complete search history.

(56) References Cited

U.S. PATENT DOCUMENTS

| | | | | |
|---|---|---|---|---|
| 5,215,460 | A * | 6/1993 | Perry | A61C 1/084 |
| | | | | 433/173 |
| 5,662,474 | A * | 9/1997 | Jorneus | A61C 8/005 |
| | | | | 433/172 |
| 5,873,721 | A * | 2/1999 | Willoughby | A61C 8/0001 |
| | | | | 433/173 |
| 5,997,299 | A * | 12/1999 | Unger | A61C 8/005 |
| | | | | 433/173 |
| 7,780,444 | B1 * | 8/2010 | Schendel | A61C 7/00 |
| | | | | 433/174 |
| 8,920,171 | B2 | 12/2014 | Nagni et al. | |
| 2007/0072150 | A1 * | 3/2007 | Mansueto | A61C 8/0022 |
| | | | | 433/174 |
| 2012/0189985 | A1 * | 7/2012 | Iglesias | A61C 8/0048 |
| | | | | 433/174 |
| 2014/0154638 | A1 | 6/2014 | Kats | |
| 2015/0351865 | A1 * | 12/2015 | Honig | A61C 8/0053 |
| | | | | 433/76 |
| 2016/0367341 | A1 | 12/2016 | Pérez Yanini | |
| 2019/0254785 | A1 * | 8/2019 | Stumpel | A61C 13/0003 |

FOREIGN PATENT DOCUMENTS

| | | | |
|---|---|---|---|
| DE | 29514042 U1 | 2/1997 | |
| EP | 2489328 A1 | 8/2012 | |
| ES | 2529606 | 2/2015 | |
| WO | WO-2012123932 A1 * | 9/2012 | A61C 1/084 |

OTHER PUBLICATIONS

English translation of International Preliminary Report on Patentability (Chapter I) for PCT/EP2016/066723; dated Jan. 16, 2018; 7 pp.

Japanese Examination Report (English translation included) for parallel Japanese Appl'n No. 2018-500932, dated Jan. 10, 2019; 9 pp.

* cited by examiner

POSITION CAPTURING DEVICE FOR TOOTH IMPLANTS

CROSS-REFERENCE TO RELATED APPLICATIONS

This is a continuation application of International patent application PCT/EP2016/066723, filed on Jul. 14, 2016, which claims the priority of German patent application DE 10 2015 111 482.8, filed on Jul. 15, 2015. The entire contents of these priority applications are incorporated herein by reference.

TECHNICAL FIELD

The present invention relates to a position capturing device for tooth implants in the mouth of a patient and to a position capturing unit for such a position capturing device and to a carrier unit for a position capturing device.

BACKGROUND OF THE INVENTION

When producing dentures, a model of the affected lower jaw and/or upper jaw of the patient is usually prepared. So-called tooth implant analogs, which are to simulate the tooth implants of the patient anchored in the jaw bone, are used, for example, in said model. It is extremely important to well-fitting dentures that the tooth implant analogs, in particular as regards their angular orientation and their alignment with respect to further tooth implant analogs, match precisely the situation in the mouth of the patient. Position capturing devices, which detect the alignment of the tooth implants in the mouth of the patient and can make a comparison possible with the model, are used in order to check this.

When using such position sensor/capturing devices, simple handling is extremely important. The object of the present invention consequently consists in creating a position capturing device which is simple for the dentist to handle, in particular even in the tight spaces in the mouth of a patient.

SUMMARY OF THE INVENTION

The object of the invention is achieved by a position capturing device for tooth implants in the mouth of a patient, having multiple position capturing units which each comprise an elongated transfer post with a shank, a tooth implant interface and a bore for receiving a tooth implant screw, a carrier unit for interconnecting the multiple position capturing units in order to fix the position thereof with respect to one another, wherein the carrier unit comprises at least one carrier element and at least two fixing elements and each fixing element comprises a fastening element for the pivotable and lockable attachment on the carrier element and a shank-receiving element for the releasable fastening on the shank of the transfer post, wherein the shank-receiving element and the fastening element are connected together so as to be rotatable and the distance between the shank-receiving elements with respect to one another is adjustable.

By means of said position capturing device, it is possible in a simple manner for the dentist to record the position of the tooth implants inserted in the jaw bone. The transfer posts are fastened into the tooth implants by means of a tooth implant screw for this purpose. The carrier unit is then inserted and fixed. The carrier unit connects two adjacent transfer posts. The insertion is very simple for the dentist as the two shank receiving elements only have to be fitted or plugged onto the transfer posts. Said operation is repeated with further adjacent tooth implants such that in each case a carrier unit connects two adjacent tooth implants.

At the end, when all the necessary carrier units have been fastened to the transfer posts, said entire unit, produced from carrier units and position capturing units, can be removed out of the mouth of the patient. The carrier units then ensure that the positioning of the transfer posts with respect to one another remains precise such that checking with the position of the tooth implant analogs is possible.

In the case of a preferred further embodiment, the transfer post is realized in two parts, wherein the first part comprises the tooth implant interface and the bore for receiving the tooth implant screw and the second part comprises the shank, to which the shank-receiving element is attachable. In a preferred manner, the first part and the second part are connectable together in a releasable manner via a predefined second interface. In a further preferred manner, a screw, which makes possible releasable fixing of the two parts, is provided in the region of the second interface.

The advantage of said measures is that both the inserting of the transfer posts and fastening to the tooth implants and the removing of the entire position capturing device are clearly made simpler.

The inserting of a transfer post is effected, in this case, in two steps, namely first of all the inserting of the first part which is connected to the tooth implant by means of the tooth implant screw. In the second step, the second part, via the defined second interface, which preferably achieves indexing, is fitted onto the first part and, for example, clamped.

When removing the position capturing device, the clamping between the first part and second part is released, for example, in order to remove the interconnected second parts. The remaining first parts are then removed as a result of releasing the tooth implant screws and are re-fastened on the associated second parts outside the mouth of the patient.

In the case of a preferred further development, the shank-receiving element is realized in the shape of a sleeve or clip and is fittable and clampable on the shank.

Said solution is structurally simple to carry out and enables not only simple displacement of the shank-receiving element on the shank, but also rotation about the longitudinal axis of the shank.

In the case of a preferred further development, the shank is realized with regard to its longitudinal extension in order to receive at least two shank-receiving elements.

As already mentioned beforehand, two adjacent position capturing units are interconnected in each case by means of one carrier unit. This means that certain transfer posts have to receive two shank-receiving elements of two carrier units in order to allow a connection to both adjacent position capturing units.

In the case of a preferred further development, the carrier element comprises a rod and the fastening element of at least one fixing element is realized in the form of a sleeve or clip in order to enable displacement along the rod, rotating or pivoting preferably about an axis perpendicular to the longitudinal axis of the rod and clamping on the rod.

It is necessary for the distances between fixing elements on the carrier element to be adjustable with respect to one another. For this purpose, either both fixing elements are attached on the carrier element so as to be displaceable or only one fixing element is attached so as to be displaceable and the other fixing element is attached fixedly on the carrier element. In both cases, the distance between fixing elements can be altered with respect to one another.

In the case of a preferred further embodiment, the first part of the transfer post comprises an external hexagon portion as second interface and the second part of the transfer post comprises an internal hexagon portion as second interface and the screw for fixing the two parts.

Said measure has proved to be advantageous, in particular because it provides an anti-rotational mechanism for the two parts with respect to one another.

In the case of a preferred further embodiment, the transfer post comprises a receiving region for a scan body on its upper end located opposite the tooth implant interface.

The advantage of said measure is that a defined reception is present which enables subsequent optical scanning of the alignments and of the positions of the transfer posts by means of introducing scan bodies.

In the case of a preferred further embodiment, one fixing element is attached on the carrier element so as to be displaceable and the further fixing element is attached on the carrier element so as to be non-displaceable.

The object of the invention is also achieved by a position capturing unit for a position capturing device of the type mentioned before, wherein the position capturing unit comprises an elongated transfer post with a shank, a tooth implant interface and a bore for receiving a tooth implant screw, wherein the transfer post is realized in two parts, wherein the first part comprises the tooth implant interface and the bore for receiving the tooth implant screw and the second part comprises the shank, to which the shank-receiving element is attachable, and wherein the first part and the second part are interconnectable in a releasable manner via a predefined second interface.

The advantages of such a position capturing unit have already been explained previously such that no further details have to be given. The possible further developments of such a position capturing unit have also already been explained previously.

The object underlying the invention is also achieved by a carrier unit for a position capturing device of the type named in the introduction for connecting multiple position capturing units together, which carrier unit comprises a preferably rod-shaped carrier element and at least two fixing elements, wherein each fixing element comprises a fastening element for the pivotable and lockable attachment on the carrier element and a shank-receiving element for the releasable fastening on the shank of the transfer post, wherein the shank-receiving element and the fastening element are connected together so as to be rotatable.

The advantages of such a carrier unit have already been explained previously, as have also the possible further developments.

It is obvious that the features named above and those yet to be explained below are usable not only in the respectively provided combination, but also in other combinations or standing alone without departing from the framework of the present invention.

BRIEF DESCRIPTION OF DRAWINGS

Further advantages and configurations of the invention are produced from the description and from the accompanying drawing, in which.

DETAILED DESCRIPTION OF THE PREFERRED EMBODIMENTS

Figure 1:
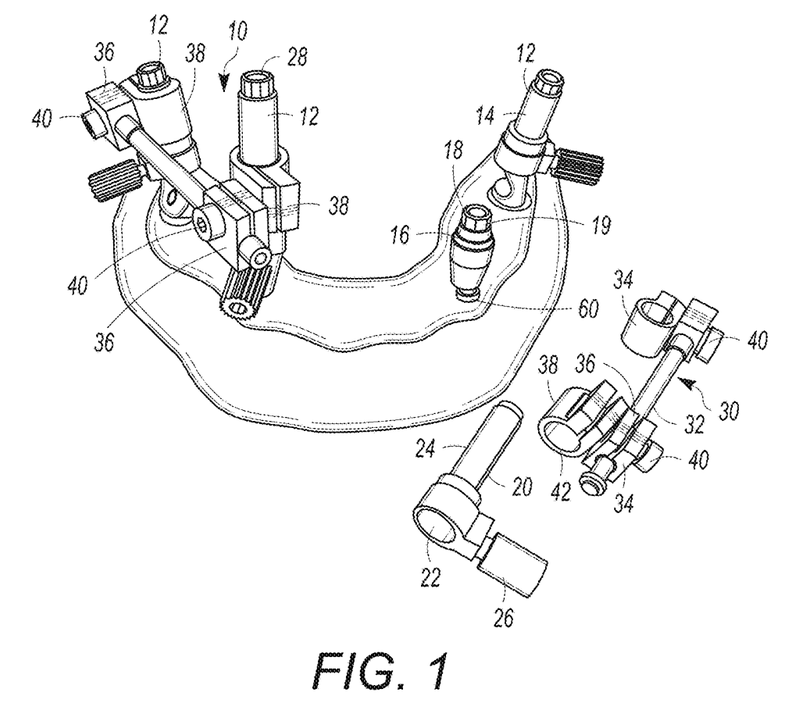
FIG. 1 shows a representation of the various components of a position capturing device.

A position sensor/capturing device is shown in FIG. 1 and is characterized by way of the reference symbol 10. The position capturing device 10 comprises multiple position capturing units 12, by means of which the position of a tooth implant 60, which is inserted in the jaw of a patient, can be recorded. The tooth implant 60 shown in FIG. 1 is a tooth implant analog which is inserted in a model of a jaw.

Each of the position capturing units 12 comprises an elongated transfer post 14 which is realized in two parts. A lower part 16 comprises an interface to the tooth implant 60 and can be fastened on the tooth implant 60 in a known manner by means of a tooth implant screw. The lower part 16 comprises a bore 18 for this purpose, into which bore the tooth implant screw can be inserted. The lower part 16 can extend in a straight manner or at an angle (in an angled manner).

An external hexagon 19, which serves as an interface and serves for the indexed connection to the other upper part 20 of the transfer post, is provided in the upper portion of the lower part 16. Said upper part 20 comprises at its lower end an internal hexagon 22 which serves as an interface and interacts with the external hexagon 19 of the lower part 16. The upper part 20 additionally comprises a cylindrical shank 24 which is realized round in cross section and in a preferred manner has the same diameter in the longitudinal direction.

A knurled screw 26, by means of which the upper part 20 is fixable on the lower part 16, for example by clamping, is provided in the region of the internal hexagon 22.

Finally, at its upper end the upper part 20 comprises a receiving region 28 which is realized as a hexagon and serves for fastening a scan body.

The position capturing device additionally comprises a carrier unit which is characterized by way of the reference symbol 30. Said carrier unit 30 serves basically for the purpose of connecting two adjacent position capturing units 12 together in such a manner that the position and alignment of the interconnected transfer posts of the position capturing unit remain fixed together such that the position and alignment in the mouth of a patient can be transferred to a model outside the mouth of the patient.

The carrier unit 30 includes a preferably rod-like carrier element 32 and two fixing elements 34 for this purpose.

The two fixing elements 34 are attached on the carrier element 32 in such a manner that the distance between them can be altered. In the present exemplary embodiment, one of the fixing elements is attached fixedly to the carrier element and the other fixing element 34 is displaceable along the carrier element.

The fixing element 34 is designed in two parts and includes a fastening element 36 and a shank-receiving element 38. Both elements 34, 36 are connected together in a preferred manner so as to be rotatable about an axis perpendicular to the longitudinal axis of the carrier element 32.

The fastening element 34 is realized in a preferred manner in the form of a sleeve or clip and surrounds the carrier element 32 in the circumferential direction almost completely. A clamping screw 40, which reduces the diameter of the sleeve-shaped region by tightening and consequently results in clamping, is provided in order to make it possible to fix the fastening element 36 on the carrier element 32. The precise technical configuration of said fastening element 36 can be seen clearly in the figures.

The shank-receiving element 38 is also realized in a similar manner and has a sleeve-shaped or clip-shaped portion 42 which is realized so as to be plugged onto the shank 24 of the transfer post 14. The reducing of the diameter of the sleeve-shaped portion which is necessary to the clamping process is also effected by means of the clamping screw 40.

Over and above this, the clamping screw 40 serves for the rotatable connection between fastening element and shank-receiving element 36, 38.

Such a carrier unit 30 then enables the connection between two adjacent position capturing units 12, in particular the upper parts 20 of the transfer posts 14. For this purpose, the two shank-receiving elements 38 of a carrier unit 30 are fitted from above onto the shanks 24 of the transfer posts, this being possible independently of the distance between the transfer posts and of the alignment of the transfer posts. The rotatable arrangement of the shank-receiving elements 38 on the fastening elements 36, the adjustability of the distance between the two fixing elements 34 with respect to one another and also the rotatability of the fastening element 36 on the carrier element 32 make possible an arbitrary, very flexible adjustment. For fastening, that is to say fixing the carrier unit 30 on the transfer posts 12, the two clamping screws 40, once mounted, only have to be tightened.

Figure 2:
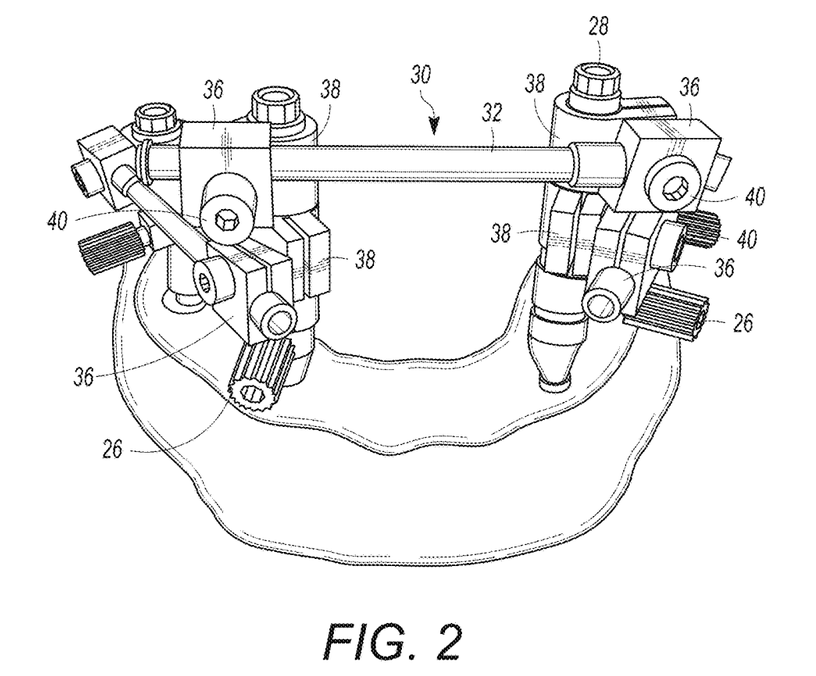
FIG. 2 shows a position capturing device with two carrier units for connecting a total of three transfer posts.
Figure 3:
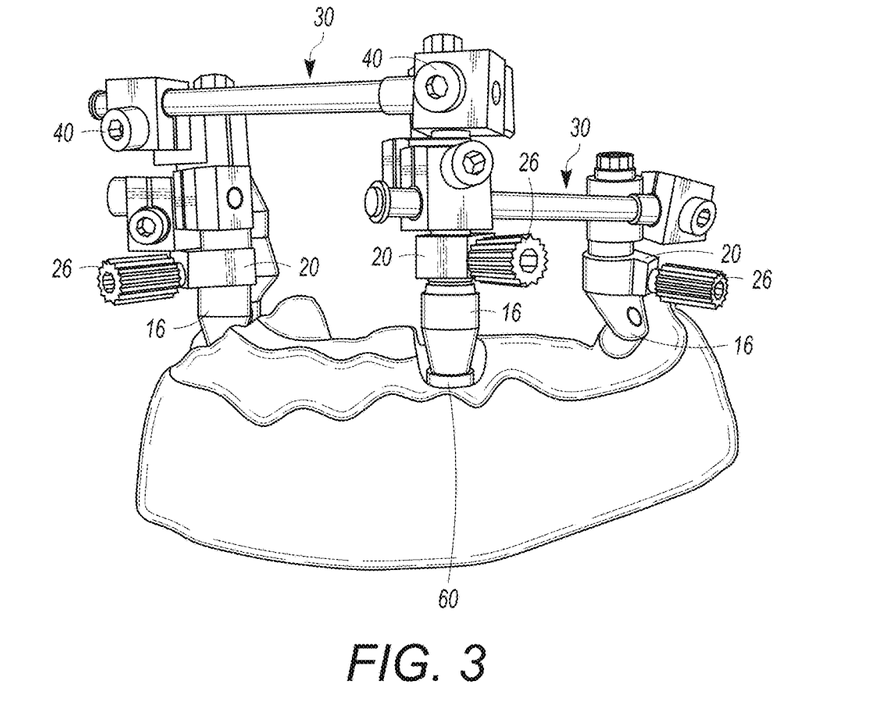
FIG. 3 shows a position capturing device with three carrier units for connecting four transfer posts.
Figure 4:
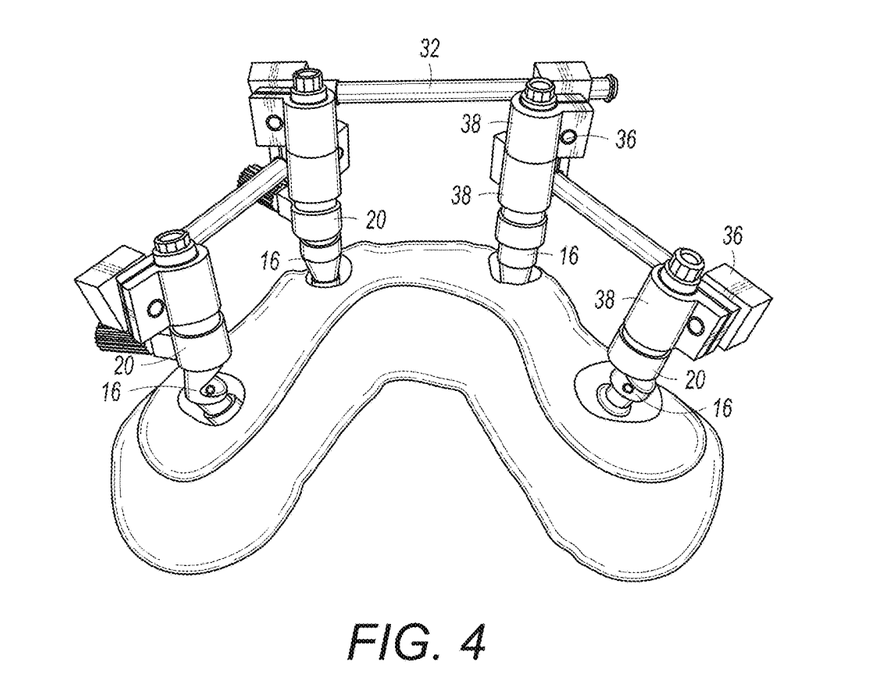
FIG. 4 shows a position capturing device according to FIG. 3 from a different perspective.
Figure 5:
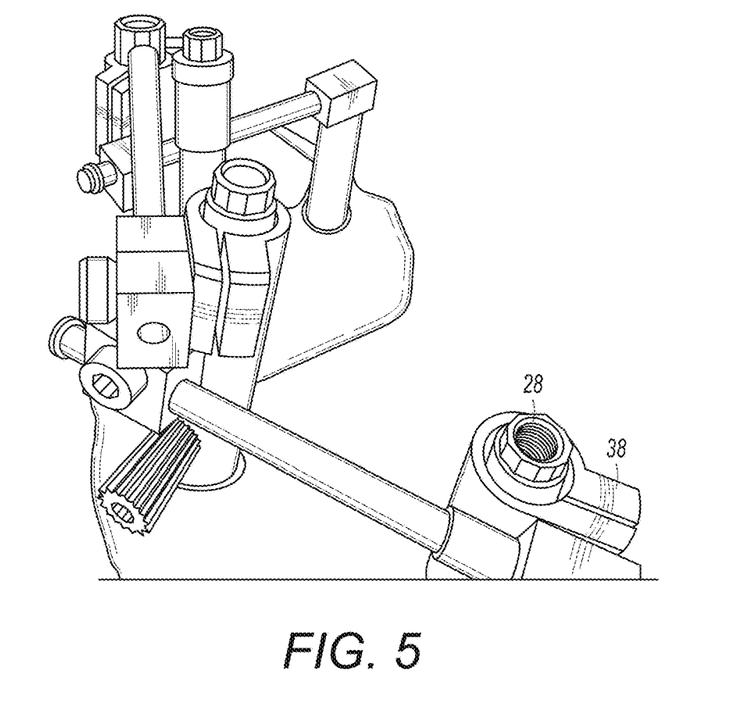
FIG. 5 shows a view of a detail of the upper portion of a position capturing unit with carrier units fitted thereon.

FIG. 2 shows a position capturing device 10 which includes multiple carrier units 30 for connecting multiple position capturing units 12. It can clearly be seen that at least two shank-receiving elements 38 are fittable onto the shank 24 of one transfer post 12 such that a connection to two adjacent transfer posts 12 is possible.

Figure 6:
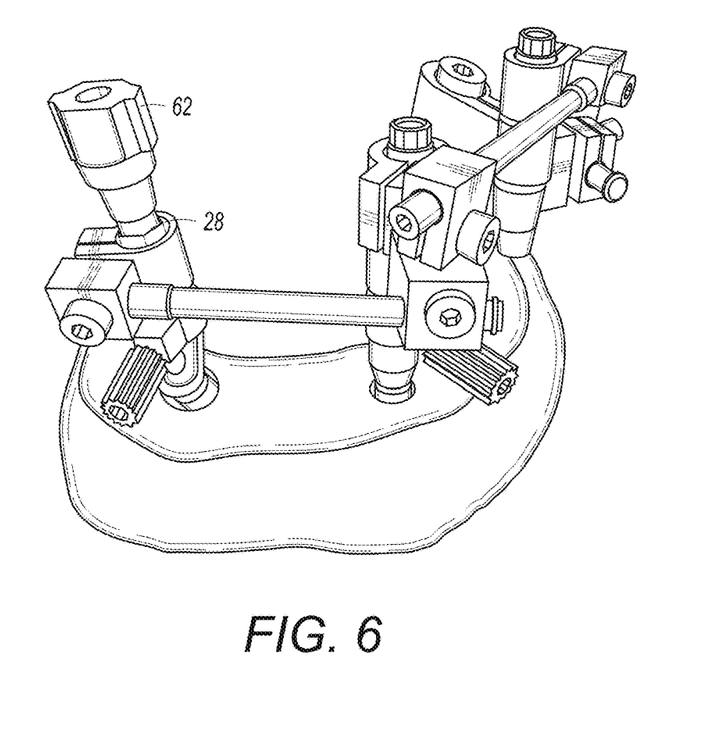
FIG. 6 shows a position capturing device with a scan body inserted.
Figure 7:
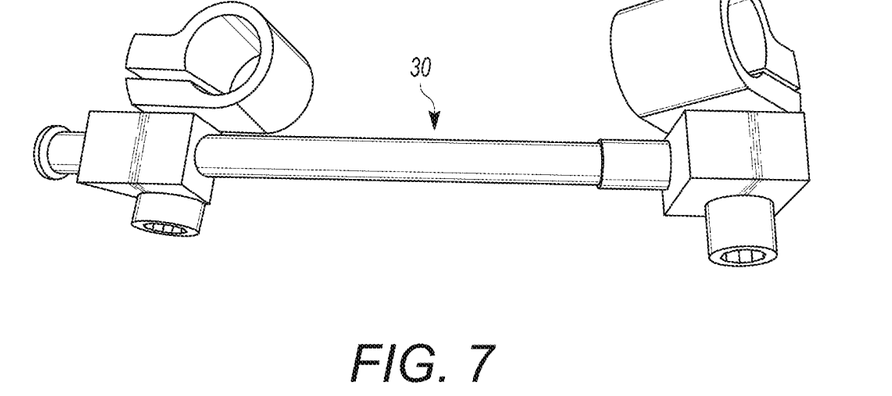
FIG. 7 shows a view of a detail of a carrier unit.
Figure 8:
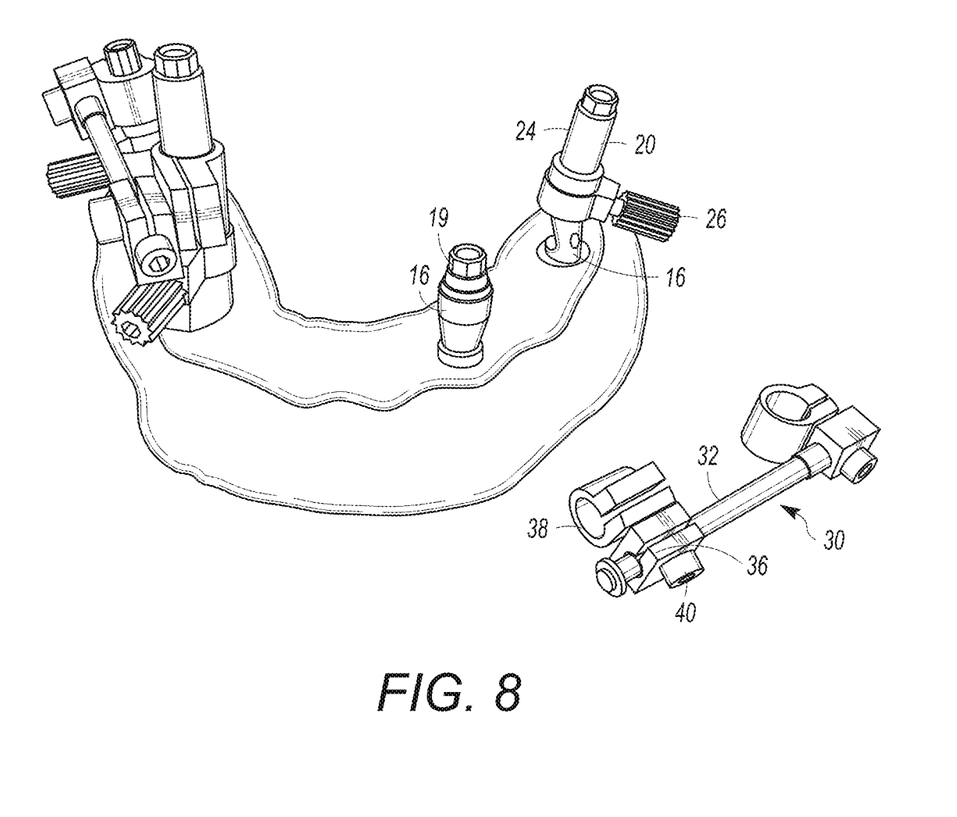
FIG. 8 shows a further representation of a position capturing device with multiple components.
Figure 9:
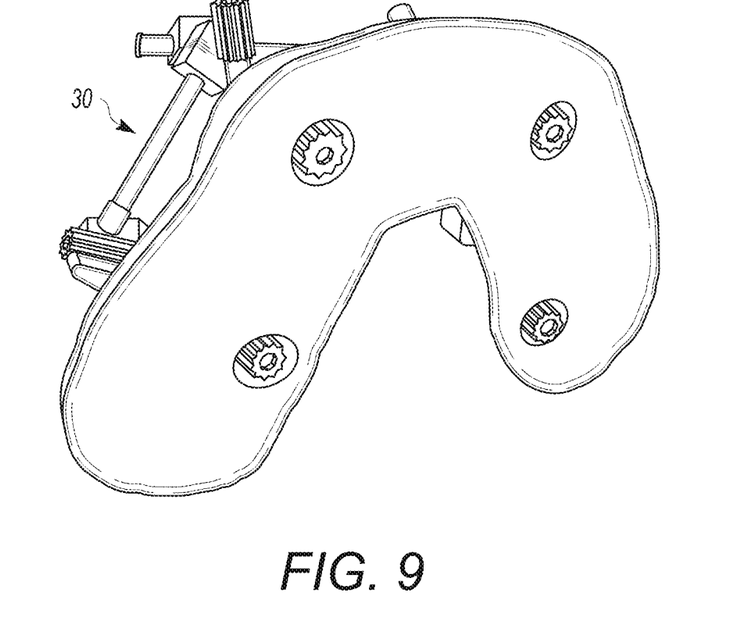
FIG. 9 shows a representation of a model with tooth implant analogs and an inserted position capturing device.
Figure 10:
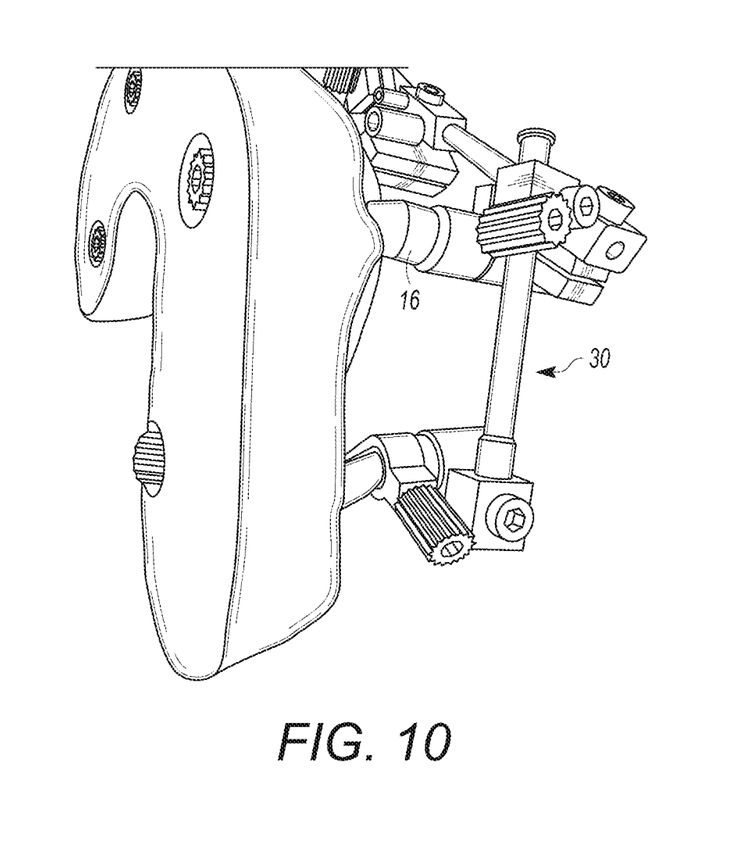
FIG. 10 shows a position capturing device according to FIG. 9 from a different perspective.

The further FIGS. 3 to 10 show the afore-described position capturing device 10 in various groupings and various perspective representations. The design of the position capturing units and of the carrier units is, however, always the same in the exemplary embodiments shown, the same reference symbols also being used for the same parts. FIG. 6 shows another scan body 62 which is inserted into the receiving region 28 of a transfer post 14. Said scan body 62 serves for the optical acquisition of the position and of the alignment of a transfer post outside the mouth of a patient. A 3D file for producing a prosthetic on the implants can be created in this manner.

To insert the position capturing device 10, the dentist first of all screws the lower parts 16 of the transfer posts 14 into the tooth implants 60.

The upper parts 20 of the transfer posts are then fitted in a rotation-locked manner via the predefined interfaces by means of indexing and are fastened by means of the knurled screws 26.

The carrier units 30 are inserted in the next step, the shank-receiving elements 38 of a carrier unit 30 being fitted onto two adjacent shanks 24. The carrier unit 30 is then fixed on the two shanks 24 by clamping by means of the two clamping screws 40. Said step of inserting a carrier unit 30 is repeated for the further position capturing units 12 until all the position capturing units 12 are connected together and consequently a manageable overall unit is created.

To remove said position capturing device 10, the dentist releases the knurled screws 26 of all the position capturing units 12 such that the interconnected upper parts 20 can be removed out of the mouth of the patient. The lower parts 16 are then removed and re-connected to the associated upper parts 20, the alignment (about the longitudinal axis) with respect to one another having been marked beforehand. The position capturing device then supplies the exact alignment and position of the tooth implants present in the mouth of the patient such that checking or creating a model is consequently possible.

Further technical features not previously described are produced from the detailed figures which show the position capturing device 10 in a detailed manner.

Along with the already explained checking and correcting of the position of the implant analogs of a model, it is also possible to screw-connect the implant analogs to the transfer posts. Once the connected implant analogs have been released, they can be screwed into impression posts of a mouth impression for producing the model. As a result, the impression posts are corrected in the impression material such that a model is created with ideally positioned implant analogs.

The invention claimed is:

1. A position capturing device for tooth implants in a mouth of a patient, comprising:
multiple position capturing units that each comprise an elongated transfer post with a shank,
a tooth implant interface and a bore configured to receive a tooth implant screw, and
a carrier unit configured to interconnect the multiple position capturing units in order to fix the position thereof with respect to one another,
wherein the carrier unit comprises a carrier element, a first fixing element and a second fixing element, and
wherein the first fixing element comprises:
a fastening element configured to pivotably and lockably attach to the carrier element, wherein the fastening element comprises a sleeve-shaped portion having a diameter and is configured to (i) surround the carrier element and (ii) allow a displacement of the fastening element along the carrier element,
a shank-receiving element configured to be releasably fastened on the shank of the transfer post, wherein the shank-receiving element comprises a sleeve-shaped portion having a diameter and is configured to be plugged onto the shank, and
a clamping screw connecting the fastening element and the shank-receiving element such that the shank-receiving element and the fastening element are rotatable relative to each other,
wherein the diameters of both sleeve-shaped portions are configured to be reduced by tightening the clamping screw to fix the fastening element on the carrier element, the shank-receiving element on the shank and the shank-receiving element with the fastening element, and wherein a distance between the shank-receiving element of the first fixing element and a shank-receiving element of the second fixing element with respect to one another is configured to be adjustable.

2. The position capturing device of claim 1, wherein:
the transfer post is realized as a first part and a second part;
the first part comprises the tooth implant interface and the bore configured to receive the tooth implant screw; and
the second part comprises the shank, to which the shank-receiving element is attachable.

3. The position capturing device of claim 2, wherein the first part and the second part are connectable together in a releasable manner via a predefined second interface.

4. The position capturing device of claim 3, further comprising:
a screw within a region of the second interface,
wherein the screw is configured to enable releasable fixing of the two parts.

5. The position capturing device of claim 4, wherein: the first part of the transfer post comprises an external hexagon portion as a first half of the predefined second interface, and the second part of the transfer post comprises an internal hexagon portion as a second half of the predefined second interface and the screw configured to fix the two parts.

6. The position capturing device of claim 1, wherein, with regard to its longitudinal extension, the shank is realized in order to receive at least two shank-receiving elements.

7. The position capturing device of claim 1, wherein:
the carrier element comprises a rod, and
the fastening element of the first fixing element is configured to enable displacement along the rod.

8. The position capturing device of claim 7, wherein displacement along the rod includes the fastening element of the first fixing element pivoting or rotating about an axis perpendicular to a longitudinal axis of the rod.

9. The position capturing device of claim 1, wherein the transfer post comprises a receiving region for a scan body on an upper end located opposite the tooth implant interface.

10. The position capturing device of claim 1, wherein:
the first fixing element is attached on the carrier element so as to be displaceable and
the second fixing element is attached on the carrier element so as to be non-displaceable.

11. A carrier unit for a position capturing device for tooth implants in a mouth of a patient, the carrier unit comprising:
multiple position capturing units that each comprise an elongated transfer post with a shank,
a tooth implant interface and a bore configured to receive a tooth implant screw, and
a carrier unit configured to interconnect the multiple position capturing units in order to fix the position thereof with respect to one another,
wherein:
the carrier unit comprises a carrier element, a first fixing element, and a second fixing element,
the first fixing element comprises:
a fastening element configured to pivotably and lockably attach to the carrier element, wherein the fastening element comprises a sleeve-shaped portion having a diameter and is configured to (i) surround the carrier element and (ii) allow a displacement of the fastening element along the carrier element,
a shank-receiving element configured to be releasably fastened on the shank of the transfer post, wherein the shank-receiving element comprises a sleeve-shaped portion having a diameter and is configured to be plugged onto the shank, and
a clamping screw connecting the fastening element and the shank-receiving element such that the shank-receiving element and the fastening element are rotatable relative to each other,
the diameters of both sleeved-shaped portions are reduced by tightening the clamping screw to fix (i) the fastening element on the carrier element, (ii) the shank-receiving element on the shank, and (iii) the shank-receiving element with the fastening element, and
a distance between the shank-receiving element of the first fixing element and a shank-receiving element of the second fixing element with respect to one another is configured to be adjustable.

12. The carrier unit of claim 11, wherein the carrier element is rod-shaped.

* * * * *